Sept 1, 1925.  G. H. H. CLEMENT  1,551,939
PEN
Filed Oct. 11, 1922

Inventor
George H.H.Clement,
By his Attorneys,

Patented Sept. 1, 1925.

1,551,939

UNITED STATES PATENT OFFICE.

GEORGE HENRY HOLLAND CLEMENT, OF SCARBOROUGH, ENGLAND.

PEN.

Application filed October 11, 1922. Serial No. 593,712.

*To all whom it may concern:*

Be it known that I, GEORGE HENRY HOLLAND CLEMENT, a subject of the King of Great Britain, residing at 23 Holbeck Road, Scarborough, England, have invented new and useful Improvements in Pens, of which the following is a specification.

The object of my invention is to provide a pen having flanges which enable it to be secured in a holder and prevent excessive flexibility. It is particularly adapted for use with a holder in which the pen is inserted below the central longitudinal axis of the holder.

In all figures *a* is a pen and *b* a penholder made of any usual rigid material, such as wood.

Figure 1:
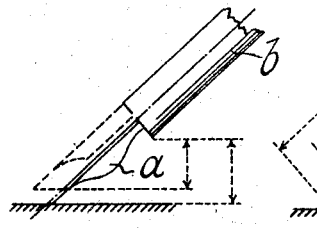
Figure 1 is a side elevation showing different positions of pen in dotted lines.
Figure 2:
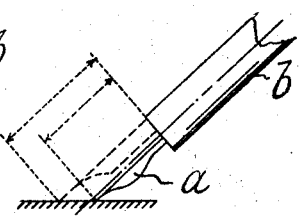
Figure 2 is a side elevation showing different lengths of pens.
Figure 3:
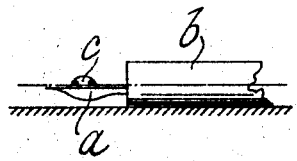
Figure 3 is a side elevation of the pen and holder lying on a flat surface.

A holder of the type illustrated is particularly suitable for use with a pen having attached to its upper surface an ink reservoir such as *c*, Figure 3, for the reason that the reservoir will be approximately coaxial with the holder, and the pen and holder may be laid flat without risk of blotting, see Figure 3.

Figure 5:
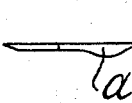
Figure 5 is a side elevation and Figure 6 a cross section of a pen adapted to be used with the holder of Figure 4.
Figure 6:
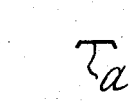
Figure 7:
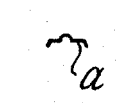
Figure 7 is a cross section of a pen and Figure 8 a cross section of a holder adapted to be used together.

In one way of constructing a holder a straight slot is formed therein which is below its axis (when the holder is in use), see Figure 4, in which case the shank of the pen is preferably made flat and provided with flanges at the sides to secure firm attachment to the holder and prevent excessive flexibility in the pen, see Figures 5 and 6. The shank is tapered at its end to facilitate insertion into the holder, see Figure 5, and may be provided with a central longitudinal bead or projection as shown in Figure 7, adapted to engage a corresponding hole adjoining the upper part of the slot in the holder, as is shown in Figure 8.

Figure 4:
Figure 4 is a cross section of one form of holder.
Figures 8, 9:
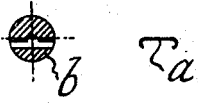
Figure 9 is a cross section of another form of pen to be used with the holder of Figure 4.
Figure 10:
Figure 10 is a cross section of a similar form of pen but adapted to be used with the holder of Figure 8.

In a modification I may use with the straight slotted holder shown in Figure 4, a pen, the shank of which is curved at the sides, as is shown in Figure 9 and 10.

Figure 11:
Figure 11 is a cross section of a holder and Figure 12 a cross section of a pen adapted to be used together.
Figure 12:
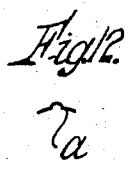

In a further modification there is formed in the holder a curved slot which is below the axis of the holder when in use, the slot having a hole adjoining it at its upper part as shown in Figure 11, a suitable pen for use therewith being shown at Figure 12.

Figure 13:
Figure 13 is a cross section of a holder and Figure 14 a cross section of a pen adapted to used together.
Figure 14:
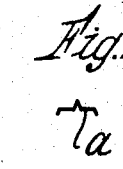

In a further modification the holder is provided with a pair of straight slots crossing one another at right angles, the point of intersection lying below the axis of the holder when in use, as is shown in Figure 13. In this case the shank of the pen employed therewith is provided with an inverted V shaped bead, as shown in Figure 14.

Figure 15:
Figures 15 and 16 are cross sections of two different forms of holder.
Figure 16:
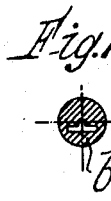

In a further modification I form a slot or recess (which does not extend across the holder), in the front end of the holder, by means of a drill for the reception of a flat heeled flanged pen. Such a penholder is shown in Figure 15. Penholders of this type need not be fitted with a collar of any description and will therefore be lighter in weight and may be cheaper to manufacture. The penholder shown in Figure 16 is similar to that shown in Figure 15 except that it is provided with a recess to receive a bead on the shank of the pen.

In all cases in which the pen is provided with a bead this latter ensures that the pen is correctly inserted in the holder, i. e., right side up.

Figure 17:
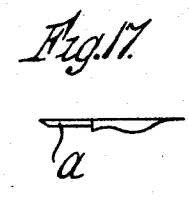
Figure 17 is a side elevation of a modified form of pen.

In any pens according to my invention I may provide flanges at the front end of the shank to prevent insertion too far into the holder, see Figure 17, or if the depth of insertion into the holder be regulated by ensuring accuracy in the length of the slots, these flanges may not be necessary.

What I claim is:—

A pen, the shank of which has a flat portion and is provided at each side with a flange which is out-turned or substantially at right angles thereto to secure firm attachment to the holder and prevent excessive flexibility of the pen.

In testimony that I claim the foregoing as my invention I have signed my name this 28th day of September, 1922.

GEORGE HENRY HOLLAND CLEMENT.